US007844967B2

(12) United States Patent
Kelly

(10) Patent No.: US 7,844,967 B2
(45) Date of Patent: Nov. 30, 2010

(54) METHOD OF ALLOCATING COMPUTING RESOURCES

(75) Inventor: Terence P. Kelly, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1786 days.

(21) Appl. No.: 10/850,318

(22) Filed: May 19, 2004

(65) Prior Publication Data

US 2005/0262509 A1 Nov. 24, 2005

(51) Int. Cl.
*G06F 9/46* (2006.01)
(52) U.S. Cl. ...................... 718/102; 718/104
(58) Field of Classification Search ................ 718/104, 718/102
See application file for complete search history.

(56) References Cited

U.S. PATENT DOCUMENTS

| | | | | |
|---|---|---|---|---|
| 6,282,560 | B1 * | 8/2001 | Eilert et al. | 718/100 |
| 6,983,463 | B1 * | 1/2006 | Hunt | 719/316 |
| 7,331,048 | B2 * | 2/2008 | Skovira | 718/102 |
| 2004/0154016 | A1 * | 8/2004 | Randall | 718/1 |
| 2005/0172291 | A1 * | 8/2005 | Das et al. | 718/104 |

OTHER PUBLICATIONS

Hans Kellerer, Ulrich Pferschy, and David Pisinger, Knapsack Problems, pp. 280-283, Springer-Verlag Berlin, Heidelberg, Germany, 2004.
Jerry Rolia, Xiaoyun Zhu, Martin Arlitt, and Artur Andrzejak, Statistical Service Assurances for Applications in Utility Grid Environments, Hewlett-Packard Labs Technical Report HPL-2002-155, Hewlett-Packard Company, Palo Alto, Jun. 28, 2002.
Abhishek Chandra, Weibo Gong, and Prashant Shenoy, Dynamic Resource Allocation for Shared Data Centers Using Online Measurements, 2003.

* cited by examiner

*Primary Examiner*—Chat C Do
*Assistant Examiner*—Camquy Truong

(57) ABSTRACT

An embodiment of a method of allocating computing resources begins with a first step of identifying applications which comprise candidates for execution on a shared computing system. In a second step, the method identifies at least one subset of the computing resources for each application. Each subset for a particular application comprises sufficient resources to support the particular application. The method continues with a third step of assigning a value to each subset. The method concludes with a fourth step of determining an assignment of the computing resources to the applications which provides a near maximal overall value.

27 Claims, 1 Drawing Sheet

METHOD OF ALLOCATING COMPUTING RESOURCES

FIELD OF THE INVENTION

The present invention relates to the field of computing. More particularly, the present invention relates to the field of computing where computing resources are allocated to applications.

BACKGROUND OF THE INVENTION

A typical shared computing system such as a utility data center includes servers and disk arrays coupled together by a network or a switch. Users run applications on the shared computing system to produce results. The applications use computing resources such as processors, memory capacity, storage capacity, and bandwidth. If the computing resources are allocated to particular applications, other applications are unable to execute on the shared computing system.

A manual technique for allocating computing resources in a shared computing system to applications employs a human operator who statically allocates resources to the application by assigning resource consumption quotas to the applications. While such a technique is adequate for small shared computing systems which are over-provisioned and which run only a few applications, such an allocation technique becomes difficult to deploy in larger systems or even systems where resources are limited.

A proposed automatic technique for allocating computing resources in a shared computing system to applications makes allocation decisions based upon probabilistic expressions of expected future resource demands supplied by users. This technique factors uncertainty into the allocation of the computing resources to the applications.

Because computing resources are expensive, often a shared computing system does not have enough resources to run all applications for users with each user receiving all of the computing resources that they desire. Often, the applications produce results with some value for a user or enterprise running the application. It would be desirable to be able to allocate the computing resources in a way which provides a maximal overall value.

What is needed is a method of allocating computing resources to applications which provides a near maximal overall value.

SUMMARY OF THE INVENTION

The present invention comprises a method of allocating computing resources. According to an embodiment, the method begins with a first step of identifying applications which comprise candidates for execution on a shared computing system. In a second step, the method identifies at least one subset of the computing resources for each application. Each subset for a particular application comprises sufficient resources to support the particular application. The method continues with a third step of assigning a value to each subset. The method concludes with a fourth step of determining an assignment of the computing resources to the applications which provides a near maximal overall value.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
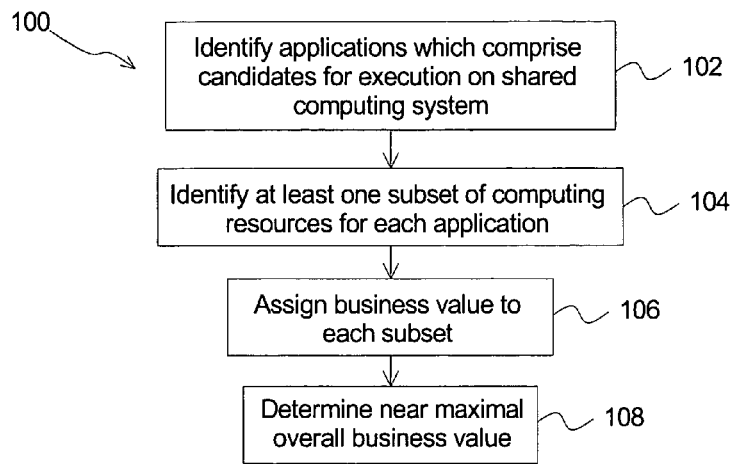
FIG. 1 illustrates an embodiment of a method of allocating computing resources in a shared computing system of the present invention as a flow chart.

An embodiment of a method of allocating computing resources in a shared computing system is illustrated as a flow chart in FIG. 1. According to an embodiment, the method 100 begins with a first step 102 of identifying applications which comprise candidates for execution on the shared computing system. According to an embodiment, the applications comprise direct revenue producing activities such as e-commerce web sites. According to another embodiment, the applications comprise computational activities which support business revenue such as accounting, engineering, and manufacturing.

The method 100 continues with a second step 104 of identifying at least one subset of the computing resources for each of the application. As used herein, the term "subset of the computing resources" means a set of the computing resources comprising some or all of the computing resources. According to an embodiment, the computing resources comprise processors, memory, storage, and bandwidth. According to this embodiment, a subset of the computing resources for a particular application comprises a number of the processors, a memory capacity, a storage capacity, and bandwidth, each of which comprises a computing resource type. For example, a subset of the resources identified for a particular application might comprise five processors, 250 MB of memory, 3 GB of disk storage, and two database connections.

By choosing at least one subset of the computing resources for each application, a person or group identifying the subset is able to include complementary computing resources within a particular subset. First and second computing resource types comprise complementary resources for an application if a utility of a first quantity of the first computing resource type assigned to the application depends upon a second quantity of the second computing resource type assigned to the application. In particular, some applications exhibit performance that strongly depends upon assignment of complementary quantities of particular computing resources. For example, allocating an extra processor to a particular application improves performance if and only if adequate memory capacity to support the extra processor is also allocated to the particular application.

Figure 2:
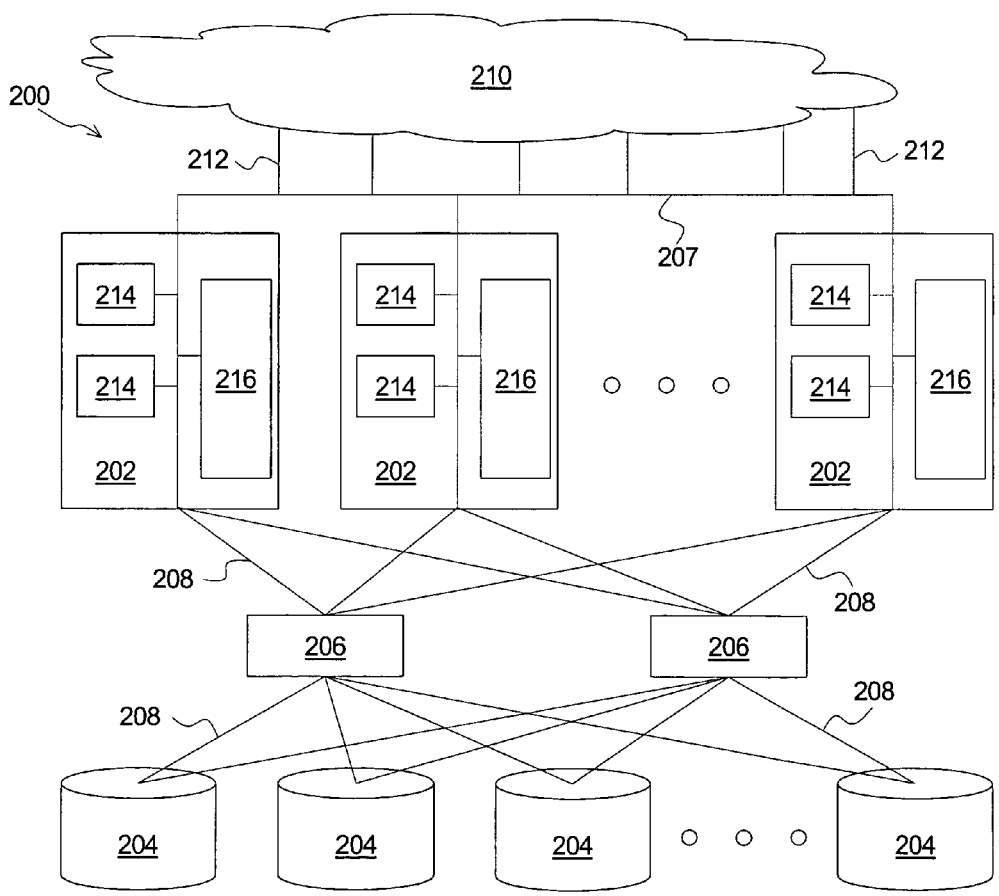
FIG. 2 illustrates an embodiment of a shared computing system for which a method of the present invention allocates computing resources to applications.

An embodiment of the shared computing system is illustrated schematically in FIG. 2. The shared computing system 200 comprises servers 202 and disk arrays 204, switches 206, and a LAN (local area network) 207. Storage network links 208 couple the servers 202 and disk arrays 204 to the switches 206. The LAN 207 couples the servers 202 together. The LAN 207 couples to an external network 210 (e.g., the Internet) via external network links 212. The servers 202 comprise processors 214 and memory 216.

The method continues in a third step 106 of assigning a business value to each of the subsets. The business value comprises an estimate made by a person or group seeking allocation of the resources to the application. It is up to such persons or groups seeking allocation of the resources to the applications to determine the business values assigned to the subsets. For example, a business value of $2,000/day might be assigned to a subset of the computing resources for an e-commerce application. According to this example, the person or group requesting the subset of the computing resources expects the e-commerce activity to generate $2,000/day in revenue if the subset of the computing resources is allocated to the e-commerce application. By assigning values to subsets which are tied to applications, the present invention allows for expression of heterogeneous preferences. For example, it may be that a subset of the computing resources has a value of $2,000/day for a first application but only $1,800/day for a second application.

The method 100 concludes with a fourth step 108 of determining a near optimal assignment of the computing resources which provides a near maximal overall business value. According to an embodiment, the near optimal assignment of the computing resources is able to allocate the computing resources to all of the applications.

According to this embodiment, scarcity of the computing resources may result in one or more of the applications being allocated computing resources according to a subset of the computing resources for the application which does not provide optimal performance for the application. For example, a person responsible for identifying subsets of the computing resources for an e-commerce application might identify first and second subsets of the computing resources with the second subset having fewer computing resources than the first subset. The person may also assign first and second values to the first and second subsets, respectively, where the second value is less than the first value. If the fourth step 108 assigns the computing resources to the second subset, the scarcity of the computing resources resulted in the smaller subset (i.e., the second subset) being allocated to the e-commerce application.

According to another embodiment, the near optimal assignment of the computing resources is unable to allocate the computing resources to all of the applications. According to this embodiment, scarcity of the computing resources results in some applications not being allocated computing resources.

By allocating the computing resources to the applications in a way that provides the near maximal overall business value, the method 100 of the present invention considers the business value of applications, the computing resources needed for applications, and the scarcity of the computing resources. Further, because the persons or groups identify the applications and the subsets of the computing resources, multiple subsets can be identified for an application with each subset being assigned its own business value. This allows sub-optimal assignment of the computing resources to particular applications while providing the near maximal overall business value for the sum of the applications in execution on the shared computing system. Further, because each subset of the computing resources is identified for an application, the person or group choosing the subset or subsets for a particular application can choose balanced subsets of the computing resources which should perform well together.

According to an embodiment, the first step 102 includes identifying a non-operation application. The non-operation application comprises choosing to not operate the shared computing system. According to this embodiment, the second step 104 includes assigning all of the computing resources for the shared computing system to the non-operation application. According to this embodiment, the business value assigned to the subset of all of the computing resources for the non-operation application in the third step 106 comprises the cost of operating the shared computing system. According to this embodiment, the fourth step 108 of allocating the computing resources will either allocate all of the computing resources to the non-operation application or will allocate some or all of the computing resources to one or more other applications.

According to another embodiment, the first step 102 includes identifying a second non-operation application. The second non-operation application comprises choosing to not operate a portion of the shared computing system. For example, the shared computing system could include a high speed processor that requires significant power and cooling making it expensive to operate. According to the example, the second non-operation application comprises choosing to not operate the high speed processor.

According to an embodiment, the fourth step 108 of determining the near optimal assignment of the computing resources employs a mathematical program. According to an embodiment, the mathematical program comprises an integer program. According to an embodiment, the integer program comprises constraints and an objective.

The integer program comprises decision variables and input values. According to an embodiment, the decision variables comprises decision variables $X_{bt}$, which are binary variables that indicate computing resources subset b is assigned to application t, where $b \in \{1, 2, 3, \ldots B_t\}$ and where $t \in \{1, 2, 3, \ldots T\}$. According to an embodiment, the input values are given in Table 1.

TABLE 1

| Input value | Value type | Description |
|---|---|---|
| $Q_{rt}(b)$ | Integer | Indicates quantity of resource r within subset b for application t |
| $N_r$ | Scalar | Indicates available units of resource r |
| $U_t(b)$ | Rational or integer | Indicates value of subset b for application t |

The constraints comprise computing resources constraints, which limit assignment of computing resources to available computing resources. According to an embodiment, the computing resources constraints comprise:

$$\sum_t \sum_b X_{bt} Q_{rt}(b) \le N_r \; \forall \, r$$

The constraints further comprise assignment constraints, which ensure that either no computing resources are allocated to an application or the computing resources identified in one and only one of the subsets of the computing resources for the application are allocated to the application. According to an embodiment, the assignment constraints comprise:

$$\sum_b X_{bt} \le 1 \; \forall \, t$$

The objective comprises maximizing a sum of the business values for the applications. According to an embodiment, the objective comprises:

$$\max \sum_t \sum_b X_{bt} U_t(b)$$

According to an embodiment, the integer program of the present invention is solved using a commercial solver such as CPLEX.

The integer program of the present invention is NP-hard according to a number of computing resource types; i.e., a worst case solution time of any solution method is thought to be inevitably exponential in the number of computing resource types. The term "NP-hard" means that an exact solution can only be obtained within a feasible time period for a small problem size. Providing more computing power only slightly increases the problem size for which one can expect to find the exact solution. If the number of computing resource types is some small number, an exact optimal solution is feasible. Today, it is possible to compute an exact solution if the number of computing resource types is fewer than four or five, assuming that hundreds or thousands of units of each resource are available. As computers become faster, larger, and less expensive, the number of computing resource types that an exact solver can handle will likely increase. In contrast, if the number of computing resource types goes beyond the small number, an exact solution may not be feasible. Instead, a solver seeks a near optimal solution rather than the optimal solution in such a situation. However, nothing prevents the solver from actually selecting the optimal solution. Accordingly, within the context of the present invention the term "near optimal solution" also encompasses the optimal solution.

According to an embodiment, the method 100 is employed in a shared computing system in which users contract for computing resources according to service level agreements. According to an embodiment, the business values for the subsets of the computing resource comprise amounts that a user is willing to pay for allocation of the computing resources to their application. According to an embodiment, the business values can take negative values which are penalties to be paid to the user if the computing resources available for the user's application fall below some threshold.

According to an embodiment, the method 100 is employed for long term resource planning such as weeks or months in advance. According to another embodiment, the method 100 is employed for short term resource reallocation where users determine that their estimates of long term needs were too low or too high. By allowing for long term planning and short term reallocation, the present invention allows allocation of computing resources in a way that covers demand uncertainty. For example, if an e-commerce application is experiencing much higher demand than anticipated, the method 100 could be performed with a larger subset of the computing resources for the e-commerce application than had been previously identified.

According to an embodiment, a system operator employs the method 100 to determine whether the shared computing system would benefit from a change in capacity. According to this embodiment, the system operator prospectively varies the computing resources and performs the method using historical records to determine whether the overall business value can be improved by increasing or decreasing available computing resources.

According to an embodiment, a computer readable media comprising computer code for implementing a method of allocating computing resources is provided. In some embodiments, the method of allocating computing resources implemented by the computer code comprises the steps of identifying applications which comprise candidates for execution on a shared computing system, and for each application, identifying at least one subset of the computing resources. Each subset for a particular application comprises sufficient resources to support the particular application. The method of allocating computing resources implemented by the computer code further comprises the steps of assigning a value to each subset, and determining an assignment of the computing resources to the applications which provides a near maximal overall value. As used herein, the term "computer readable media" is defined as tangible media and explicitly excludes signals, carrier waves and the like that constitute transient or non-tangible phenomena. As such, "computer readable media" is strictly recognized as "non-transitory computer readable media" by definition herein.

In other embodiments, a computer readable media comprises computer code that implements a method of allocating computing resources that comprises the steps of identifying applications which comprise candidates for execution on a shared computing system, and for each application, identifying at least one subset of the computing resources. Each subset for a particular application comprises sufficient resources to support the particular application. The method of allocating computing resources implemented by the computer code further comprises the steps of assigning a value to each subset, limiting assignment of the computing resources to available computing resources, and for each application, assigning no computing resources or assigning the computing resources identified in one and only one particular subset of the computing resources identified for the application. The method of allocating computing resources implemented by the computer code further comprises the step of determining an assignment of the computing resources to the application which provides a near maximal sum of the values for the applications. In some embodiments the computer readable media may comprise code that implements the method 100 of allocating computing resources described above.

The present invention provides a unified framework that incorporates three classes of considerations. First, the present invention considers business values (i.e., rewards) that accrue when applications receive computing resources. Second, according to an embodiment, the present invention considers the penalties incurred when an application or applications fails to receive resources to which it or they are entitled. Third, according to an embodiment, the present invention accounts for operational costs (e.g., power and cooling). Thus, according to embodiments, the present invention accounts for rewards, penalties, and costs when allocating computing resources to applications.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A computer-implemented method of allocating computing resources comprising:
   identifying applications which comprise candidates for execution on a shared computing system;
   for each application identified, identifying at least one subset of the computing resources, each subset for a particular identified application comprising sufficient resources to support the particular identified application;

assigning a business value to each subset of computing resources, the business value being tied to the particular identified application and representing the business value of the subset of computing resources when that subset is used to run the particular identified application; and determining an assignment of the computing resources to the identified applications which provides a near maximal overall business value of the shared computing system, determining the assignment being performed by a computer, wherein determining the assignment of the computing resources to the identified applications which provides the near maximal overall business values of the shared computing system comprises maximizing a sum of the business values for the identified applications given by $$\max \sum_t \sum_b X_{bt} U_t(b)$$

where t is an index of the identified applications, t∈{1, 2, 3, ... T}, b is an index of the subsets of the computing resources identified for a particular identified application t, b∈{1, 2, 3, ... $B_t$}, $X_{bt}$ is a binary decision variable that indicates computing resource subset b is assigned to the particular identified application t, and where $U_t(b)$ is the assigned business value of the computing resource subset b when the computing resource subset b is used to run the particular identified application t.

2. The method of claim 1 wherein the near maximal overall business value comprises a maximal overall value.

3. The method of claim 1: wherein the applications comprise first and second applications; and
the method further comprises assigning particular computing resources to a third application.

4. The method of claim 3 wherein determining the assignment of the computing resources to the first and second applications limits available computing resources for the first and second applications to the computing resources less the particular computing resources.

5. The method of claim 1 wherein the shared computing system comprises processors, memory, and storage.

6. The method of claim 5 wherein a particular subset of the computing resources comprises one or more of a quantity of the processors, a memory capacity and a storage capacity.

7. The method of claim 5 wherein the shared computing system further comprises network links, and wherein a particular subset of the computing resources comprises a network bandwidth.

8. The method of claim 1 wherein identifying the applications identifies a non-operation application.

9. The method of claim 8 wherein identifying at least one subset of the computing resources assigns a particular subset of the computing resources to the non-operation application.

10. The method of claim 8 wherein identifying at least one subset of the computing resources assigns all of the computing resources to the non-operation application.

11. The method of claim 10 wherein assigning a business value to each subset comprises assigning a cost of operating the shared computing system as the business value for the subset of the computing resources for the non-operation application.

12. The method of claim 11 wherein:
the identified applications comprise the non-operation application and remaining applications; and if determining an assignment of the computing resources to the identified applications assigns the computing resources to the non-operation application, the shared computing system executes none of the remaining applications.

13. The method of claim 1 wherein determining an assignment of the computing resources to the identified applications employs constraints and an objective.

14. The method of claim 13 wherein the constraints comprise:
limiting assignment of the computing resources to available computing resources; and
for each identified application:
assigning no computing resources; or
assigning the computing resources identified in one and only one particular subset of the computing resources identified for the identified application.

15. The method of claim 13 wherein the objective comprises maximizing a sum of the business values for the identified applications.

16. The method of claim 1 further comprising modifying at least one of the subsets of the computing resources.

17. The method of claim 16 further comprising determining a reassignment of the computing resources to the identified applications which provides a new near maximal overall business value.

18. The method of claim 1 further comprising modifying at least one of the business values assigned to the subsets of the computing resources.

19. The method of claim 18 further comprising determining a reassignment of the computing resources to the identified applications which provides a new near maximal overall business value.

20. The method of claim 1 further comprising:
identifying a new application which is added to the candidates for execution on the shared computing system;
for the new application, identifying at least one additional subset of the computing resources; and
assigning the business value to each identified additional subset.

21. The method of claim 20 further comprising determining a reassignment of the computing resources to the identified applications and the new application which provides a new near maximal overall business value.

22. The method of claim 1 further comprising reducing the candidates by at least one of the identified applications.

23. The method of claim 22 further comprising determining a reassignment of the computing resources to the identified applications which provides a new near maximal overall business value.

24. The method of allocating computing resources of claim 1, further comprising applying constraints that limit assignment of the computing resources to available computing resources, the constraints being given by $$\sum_t \sum_b X_{bt} Q_{rt}(b) \leq N_r \ \forall \ r$$

and $$\sum_b X_{bt} \leq 1 \ \forall \ t$$

where r is an index of the computing resources of the shared computing system, $Q_{rt}(b)$ indicates a quantity of the computing resources within the subset of computing resources b for the particular identified application t, and $N_r$ indicates an available quantity of the computing resources.

25. A computer-implemented method of allocating computing resources comprising:
  identifying applications which comprise candidates for execution on a shared computing system;
  for each application identified, identifying at least one subset of the computing resources, each subset for a particular identified application comprising sufficient resources to support the particular identified application;
  assigning a business value to each subset of the computing resources, the business value being tied to the particular identified application and representing the business value of the subset of the computing resources when that subset is used to run the particular identified application;
  limiting assignment of the computing resources to available computing resources; and
  further for each application identified:
    assigning no computing resources; or
    assigning the computing resources identified in one and only one particular subset of the computing resources identified for the identified application; and
  determining an assignment of the computing resources to the identified applications which provides a near maximal sum of the business values for the identified applications, determining an assignment being performed by a computer, wherein determining the assignment of the computing resources to the identified applications which provides the near maximal sum of the business values for the identified applications comprises maximizing a sum of the business values for the identified applications given by $$\max \sum_t \sum_b X_{bt} U_t(b)$$

where t is an index of the identified applications, t∈{1, 2, 3, . . . T}, b is an index of the subsets of the computing resources identified for a particular identified application t, b∈{1, 2, 3, . . . $B_t$}, $X_{bt}$ is a binary decision variable that indicates computing resource subset b is assigned to the particular identified application t, and where $U_t(b)$ is the assigned business value of the computing resource subset b when the computing resource subset b is used to run the particular identified application t.

26. A computer readable media storing computer code for implementing a method of allocating computing resources, the method of allocating computing resources comprising:
  identifying applications which comprise candidates for execution on a shared computing system;
  for each application identified, identifying at least one subset of the computing resources, each subset for a particular identified application comprising sufficient resources to support the particular identified application;
  assigning a business value to each subset of the computing resources, the business value being the business value of the subset of the computing resources when that subset is used to run the particular identified application; and
  determining an assignment of the computing resources to the identified applications which provides a near maximal sum of the business values for the identified applications, wherein determining the assignment of the computing resources to the identified applications which provides the near maximal sum of the business values for the identified applications comprises maximizing a sum of the business values for the identified applications given by $$\max \sum_t \sum_b X_{bt} U_t(b)$$

where t is an index of the identified applications, t∈{1, 2, 3, . . . T}, b is an index of the subsets of the computing resources identified for a particular identified application t, b∈{1, 2, 3, . . . $B_t$}, $X_{bt}$ is a binary decision variable that indicates computing resource subset b is assigned to the particular identified application t, and where $U_t(b)$ is the assigned business value of the computing resource subset b when the computing resource subset b is used to run the particular identified application t.

27. A computer readable media storing computer code for implementing a method of allocating computing resources, the method of allocating computing resources comprising:
  identifying applications which comprise candidates for execution on a shared computing system;
  for each application identified, identifying at least one subset of the computing resources, each subset for a particular identified application comprising sufficient resources to support the particular identified application;
  assigning a business value to each subset of the computing resources, the business value being the business value of the subset of the computing resources when that subset is used to run the particular identified application;
  limiting assignment of the computing resources to available computing resources; and
  further for each application identified:
    assigning no computing resources; or
    assigning the computing resources identified in one and only one particular subset of the computing resources identified for the identified application; and
  determining an assignment of the computing resources to the identified applications which provides a near maximal sum of the business values for the identified applications, wherein determining the assignment of the computing resources to the identified applications which provides the near maximal sum of the business values for the identified applications comprises maximizing a sum of the business values for the identified applications given by $$\max \sum_t \sum_b X_{bt} U_t(b)$$

where t is an index of the identified applications, t∈{1, 2, 3, . . . T}, b is an index of the subsets of the computing resources identified for a particular identified application t, b∈{1, 2, 3, . . . $B_t$}, $X_{bt}$ is a binary decision variable that indicates computing resource subset b is assigned to the particular identified application t, and where $U_t(b)$ is the assigned business value of the computing resource subset b when the computing resource subset b is used to run the particular identified application t.

* * * * *

UNITED STATES PATENT AND TRADEMARK OFFICE
CERTIFICATE OF CORRECTION

| | | |
|---|---|---|
| PATENT NO. | : 7,844,967 B2 | Page 1 of 1 |
| APPLICATION NO. | : 10/850318 | |
| DATED | : November 30, 2010 | |
| INVENTOR(S) | : Terence P. Kelly | |

It is certified that error appears in the above-identified patent and that said Letters Patent is hereby corrected as shown below:

In column 7, line 33, in Claim 3, delete "claim 1:" and insert -- claim 1 --, therefor.

Signed and Sealed this
Twenty-second Day of March, 2011

David J. Kappos
*Director of the United States Patent and Trademark Office*